July 1, 1930. M. H. TONCRAY 1,769,242
VEHICLE SEAT
Filed April 8, 1926
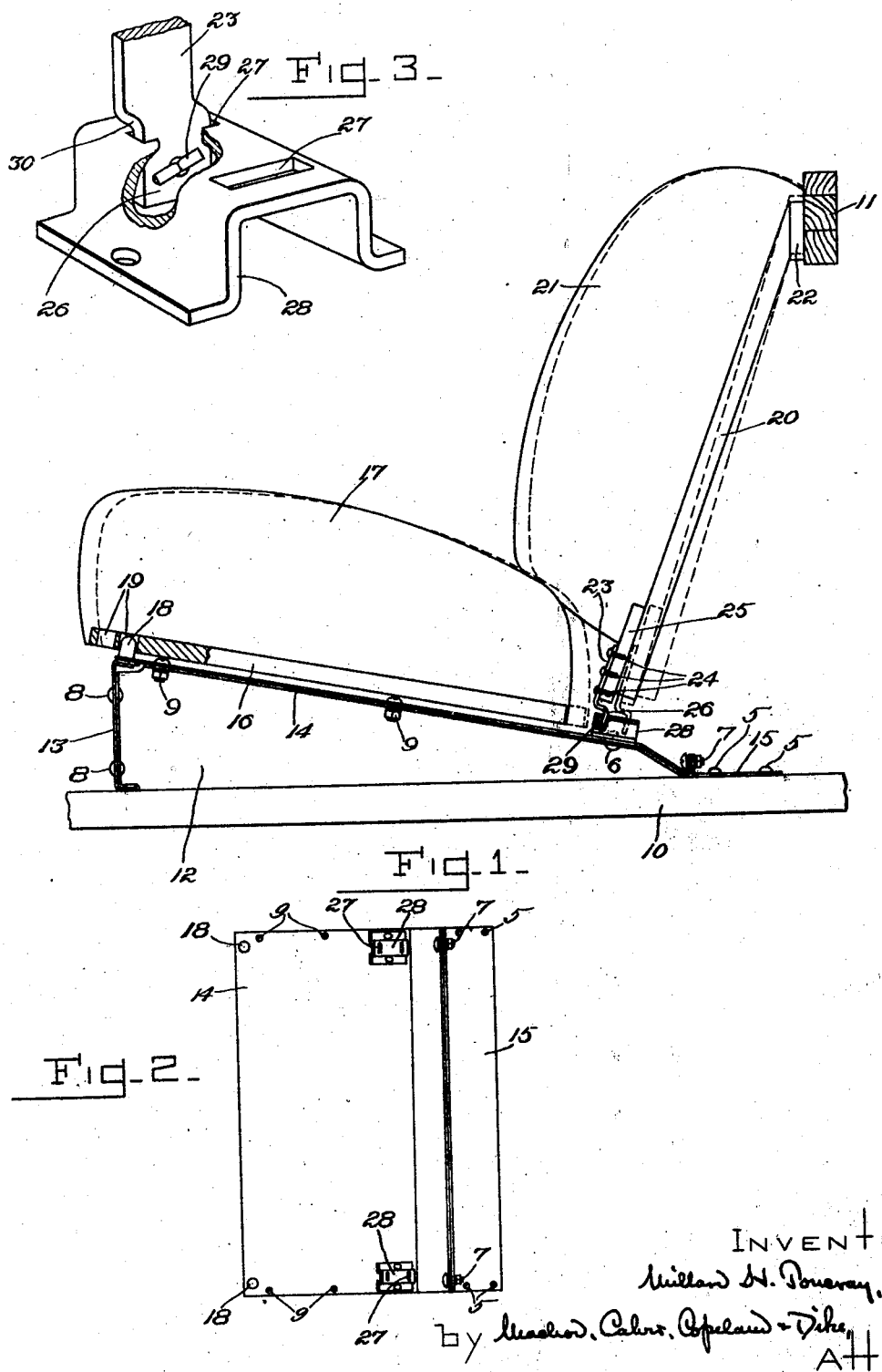
INVENTOR=
Millard H. Toncray,
by Macleod, Calver, Copeland & Dike,
Attys.

Patented July 1, 1930

1,769,242

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

VEHICLE SEAT

Application filed April 8, 1926. Serial No. 100,585.

This invention relates to vehicle seats, and especially, although not exclusively, to the rear bench seats of closed automobile bodies of the coach or sedan type.

The invention has for an object to provide an improved hinge connection between the back and bottom of the seat which will permit the back to be swung forwardly for the purpose of storing tools, luggage, or other articles in the rear thereof, said hinge being of a simple and inexpensive construction which can be made and installed with a minimum expenditure of time and labor. Another object of the invention is to provide a seat having provision for adjusting the inclination of the back in order to adapt the same to the posture most comfortable to the passenger.

The foregoing and other objects of the invention, together with means whereby the latter may be carried into effect, will best be understood from the following description of a preferred embodiment thereof illustrated in the accompanying drawings. It will be understood, however, that the particular construction described and shown has been chosen for illustrative purposes merely, and that the invention, as defined by the claims hereunto appended, may be otherwise embodied without departure from its spirit and scope.

In said drawings:

Fig. 1 is a side elevation of a seat embodying the invention, showing two positions of adjustment in full and broken lines, respectively.

Fig. 2 is a plan view, on a reduced scale, of the seat base.

Fig. 3 is an enlarged detail view, partly broken away, of one of the adjustable hinge connections.

In Fig. 1, 10 denotes one of the side sills of an automobile body and 11 a rear frame cross member. The seat to which the present invention relates comprises a bottom supported on the side sills 10 and a back connected at its lower edge to the seat bottom adjacent the rear edge of the latter, the upper edge of the seat back resting against the frame cross member 11 which forms a support for said upper edge. The connection between the back and bottom preferably comprises a detachable and adjustable hinge, permitting the back to be removed or to be swung forwardly to afford access to the space in the rear thereof, and also permitting the position of said back to be otherwise varied to suit the comfort and convenience of the user.

In the construction shown, the seat bottom comprises a suitable base or sub-structure upon which is superimposed the usual seat cushion. The base or sub-structure comprises seat risers 12 carried by the side sills 10, a transverse heel board 13 connecting the seat risers 12 and secured at its ends, as by rivets 8, to the front vertical edges of the latter, and a seat pan 14 connecting the upper edges of the seat risers and secured thereto at its ends, as by bolts 9, the rear edge of said seat pan being secured, as by bolts 7, to a bracket 15 connecting and secured, as by rivets 5, to the tops of the sills. The seat cushion comprises a base frame 16 carrying suitable upholstery 17. The cushion is positioned and held in place on the base by means of dowels or studs 18 projecting from the latter and received in holes 19 formed in the base frame 16.

The seat back comprises a frame 20 carrying suitable upholstery 21, said frame 20 projecting at its lower edge below the upholstery 21 and having at its upper edge a transverse member or abutment 22 to engage the support 11.

The hinge connecting the seat back and seat bottom comprises downwardly projecting, preferably metallic strips 23 secured, as by screws 24, to the lower edge of the frame 20, or, as shown, to a strip or block 25 secured to or forming a part of the latter. The strips 23 are formed with offset ends 26 received in holes or slots 27 formed in the tops of inverted channel-shaped brackets 28 secured, as by rivets 6, to the seat base. Below the tops of the brackets 28, the offset lower ends 26 of the strips 23 are formed with holes to receive cotter pins 29. Said cotter pins serve to limit the upward movement of the seat back with respect to the brackets 28, while the shoulders 30 formed by the offset ends 26 of the strips 23 similarly limit the downward movement.

The hinge above described, besides being of very simple and inexpensive construction, has many advantages in the ease and speed of assembly of the parts and in the removability of the seat back. The brackets 28 may be fastened to the substructure of the seat in the body plant, and the strips 23 secured to the seat back frame 20 as a part of the bench trim. The completed seat back is placed in the body on the final trim line, and the ends of the strips 23 inserted in the slots 27, thereby accurately locating the back in place. The cotter pins 29 are then inserted to prevent accidental displacement of the back. When the seat bottom cushion is put in place, it presses against the back cushion and prevents all possibility of rattle at the hinge. The operations of the body builder are thus greatly facilitated, while the owner of the vehicle can, if he so desires, readily remove the seat back as well as the bottom cushion, in order to give additional carrying space or for the purpose of re-arranging the cushions for sleeping purposes, merely by removing the cotter pins 29 and lifting the back to disengage the strips 23 from the slots 27 in the brackets 28.

In accordance with another feature of the invention, the base frame 16 of the bottom cushion is preferably provided with a plurality of holes 19 selectively engageable by each projection or dowel 18, while each of the brackets 28 is provided with a plurality of slots 27 selectively engageable by the corresponding strip or projection 23. This construction provides for variation in the position of the axis of the hinge with respect to the vertical plane of the support 11 and for a corresponding variation in the position of the seat bottom cushion. It will be seen that by choosing the slots 27 into which the projections 23 are inserted, the owner of the vehicle is enabled to choose an angle of the seat back best suited to his requirements, while the corresponding multiplication of the dowel holes 19 permits him to adjust the seat bottom cushion in accordance with the adjustment of the back.

Having thus described my invention, I claim:

1. A vehicle seat including a bottom, a back, and a hinge connecting said back with said bottom, said hinge including brackets secured to the bottom and provided with holes and aligned projections on said back having offset ends loosely engaging said holes to serve as a stop limiting the downward movement of said back while permiting swinging thereof relative to said bottom.

2. A vehicle seat including a bottom, inverted channel-shaped brackets secured to said bottom, said brackets having slots in their tops, a back, aligned strips secured to and projecting from the lower edge of said back and having offset ends loosely engaging said slots to permit swinging of said back relative to said bottom, and cotter pins in said ends below the tops of said brackets.

3. In a vehicle, a seat base having projections, a seat cushion including a base frame having a plurality of holes selectively engageable by each of said projections, a seat back, brackets secured to said base and provided with holes, projections on the lower edge of said back loosely engaging said holes to permit swinging of said back relative to said base, each of said brackets having a plurality of holes selectively engageable by the corresponding projection, and a support against which the upper edge of said back rests.

In testimony whereof I affix my signature.
MILLARD H. TONCRAY.